United States Patent [19]

Conrad et al.

[11] Patent Number: 4,919,972
[45] Date of Patent: Apr. 24, 1990

[54] PROCESS FOR SURFACE MODIFICATION OF POLYMER ARTICLES

[75] Inventors: Neal Conrad, Trenton; Michael T. Burchill, Cranbury; Joseph Silbermann, Old Bridge; Thomas Hoffman, Brick, all of N.J.; Maurice Bourrel, Pau, France

[73] Assignee: M & T Chemicals Inc., Woodbridge, N.J.

[21] Appl. No.: 225,448

[22] Filed: Jul. 28, 1988

Related U.S. Application Data

[63] Continuation-in-part of Ser. No. 945,595, Dec. 23, 1986, Pat. No. 4,770,905.

[51] Int. Cl.$^5$ .................................................. B05D 5/00
[52] U.S. Cl. ..................................... 427/160; 252/589; 427/331; 427/336; 427/353; 427/377; 427/430.1; 427/434.2
[58] Field of Search ............... 427/160, 336, 434.2, 427/331, 350, 377, 430.1; 252/589

[56] References Cited

U.S. PATENT DOCUMENTS

| | | | |
|---|---|---|---|
| 3,076,723 | 2/1963 | Covington | 427/160 |
| 3,297,462 | 1/1967 | Fanning | 427/160 |
| 3,519,462 | 7/1970 | Bristol | 427/160 |
| 3,870,519 | 3/1975 | Piller | 427/160 |
| 4,319,016 | 3/1982 | Kurobe et al. | 427/160 |
| 4,396,644 | 8/1983 | Taniyama | 427/160 |

FOREIGN PATENT DOCUMENTS 1024342  3/1966  United Kingdom ................ 427/160

*Primary Examiner*—Janyce Bell
*Attorney, Agent, or Firm*—Finnegan, Henderson, Farabow, Garrett & Dunner

[57] ABSTRACT

A composition and process for modifying the surface region of a polymer article. The composition is a mixture of a resin surface modifier ingredient, a resin-swellable organic solvent and a surfactant additive. The composition is contacted with the surface of a resin article, while the article is immersed in a liquid which may also contain a surfactant which is non-aggressive toward the article and immiscible with the solvent. The surfactant alters the wetting characteristics of the air-liquid, or liquid-surface modifier interfaces, or both interfaces, so that a film of the modifier ingredient does not form on the surface of the liquid layer.

18 Claims, No Drawings

PROCESS FOR SURFACE MODIFICATION OF POLYMER ARTICLES

This application is a continuation-in-part of copending patent application Ser. No. 945,595, filed Dec. 23, 1986, now Patent No. 4,770,905 entitled "Process for Surface Modification of Polymer Articles", which disclosure is hereby incorporated by reference.

BACKGROUND OF INVENTION

1. Field of the Invention

This invention relates to surface modified resinous articles, and processes for making same, and more particularly, to an improved method and composition for making said articles in a continuous manner.

2. Description of the Prior Art

In the aforesaid copending patent application, there is described a method of incorporating a modifier ingredient such as a U.V. absorber into the surface region of a resinous body, e.g. a PVC sheet. The method includes the steps of: (1) immersing the body in a liquid such as water and (2) contacting the immersed body with a solution of the modifier ingredient in a solvent such as methylene chloride which is immiscible with the liquid and which will swell the surface of the resin to allow the solution to enter its surface region.

In the continuous mode of practicing this process, the solution is present as a lower layer, water is the upper layer, a continuous polymer sheet article is transported through the water, and the solution is pumped from the lower layer into the upper layer and directed onto the top surface of the sheet for a predetermined contact time during which time the modifier ingredient is incorporated into the contacted surface. After the solution is applied, a jet of water is directed onto the treated surface to displace any residual solution remaining thereon.

When this process is run for an extended period at room temperature, however, it is observed that a solid precipitate of U.V. stabilizer material accumulates on the surface of the water layer. This solid material circulates throughout the system which tends to clog the pumping and piping equipment used both for applying the solution to the resin surface and for displacing residual solution thereon.

While suitable filters and/or skimmers may be used in the system to remove the solid material floating on the surface of the water layer, such equipment is relatively costly and requires periodic maintenance.

Accordingly, it is an object of the present invention to provide a method for preventing the accumulation of solid precipitate material which appears on the surface of the water layer in the surface modification process of the aforesaid patent application.

A more particular object herein is to provide a system, composition and method for substantially eliminating the problem of solid formation on the surface of the water layer in such process.

A feature of the invention is the use of a surfactant to change the wetting characteristics of the air-water, or water-surface modifier solution interfaces, or both interfaces, so that solid modifier ingredient does not form on the surface of the water layer.

Another feature herein is the provision of a surface modification system which includes an upper water layer, a lower modifier solution layer, and a surfactant in one or both of said layers.

Still another feature of the invention is the provision of a surface modifier composition which includes a modifier ingredient, a resin-swellable, water-immiscible solvent, and a surfactant, and a process for incorporating said modifier ingredient from said composition into the surface region of a resinous body in a continuous matter without forming unwanted solid material therein.

These and other objects and features of the invention will be made apparent from the following more particular description thereof.

SUMMARY OF THE INVENTION

An improved process of incorporating a modifier ingredient into the surface region of a resinous article is described herein. The basic process comprises immersing the article in a liquid such as water and contacting the immersed article with a solution of a modifier ingredient in a solvent which is immiscible with the liquid. The improvement herein comprises including a surfactant either the liquid or solution, or both. In one embodiment, the invention comprises contacting the immersed article with a composition which includes a modifier, a resin-swellable, water-immiscible solvent and a surfactant. The presence of the surfactant in the system prevents solid modifier material from forming on the water surface.

DETAILED DESCRIPTION OF THE INVENTION

During the resin surface modification process described herein, it is observed that small droplets comprised of solid modifier, solvent and air form at the water-solution interface and gradually rise to the surface of the water layer. While floating on the water surface, the volatile solvent in the droplets can evaporate, leaving the film of solid modifier material on the water layer.

It has been discovered herein that such solid modifier material does not appear on the surface of the water layer in this resin surface modification process when a surfactant is included in the upper water layer and/or in the lower solution layer. The presence of the surfactant in the system can change the wetting characteristics of the air-water and/or water-solution interfaces so that droplets do not form at the water-solution interface, or remain on the surface of the water layer. The surfactant in the system is believed to increase wetting of the organic solvent by water, or to lower the surface tension of the water at the air-water interface.

In accordance with the present invention, therefore, there is provided herein a modifier composition for use in the basic process. The modifier composition of the invention comprises a modifier ingredient, a resin-swellable organic solvent for the modifier ingredient, and a surfactant additive.

Suitably, the modifier composition comprises a solution of about 1–60% by wt. of the surface modifier ingredient in a resin-swellable organic solvent, and about 0.1–6% by wt. of a surfactant additive dissolved therein. Preferably, the modifier composition includes about 10–40% by wt. of a U.V. stabilizer and about 1–3% by wt. of a water-insoluble, organic solvent soluble, non-ionic surfactant having an HLB value in the range of about 3–10.

Suitable modifier ingredients include U.V. stabilizers, anti-stats, anitoxidants, dyes, pigments, optical brighteners, anti-skid agents, and the like. Such modifier ingredients can affect the properties of a resinous article in an advantageous manner when present in the surface region of the article, i.e. below or on the surface of the article. A preferred modifier ingredient is a U.V. stabilizer.

As described, the preferred liquid media in the method used herein is water or an aqueous solution or emulsion thereof. Other liquids, however, can be used as long as they are "incompatible" with the organic solvent. The term "incompatible" is defined herein to mean a liquid having a solubility of no more than about 15% by wt. in the organic solvent and at ambient temperature and pressure. Such liquid includes alkanols and other water miscible liquids.

Similarly, the solvent in the stabilizer solution should be "liquid-immiscible solvent," which also is defined as a solubility in liquid at ambient temperature and pressure of no more than about 15% by volume.

The solvent in the modifier composition of the invention is a resin-swellable organic solvent which is immiscible with the liquid (typically water) into which the resinous article is immersed. A water-immiscible solvent is defined as having a solubility in water at ambient temperature and pressure of no more than about 15 percent by volume. Representative organic solvents suitable for use in the composition and process of the invention include halogenated hydrocarbons having up to six, preferably up to two, carbon atoms in the chain; ketones, both aliphatic and cycloaliphatic; aliphatic esters, ethers, and the like. Typical halogenated hyrocarbons include methylene chloride, chloroform, 1,2-dichloroethane, 2-chloro-2-methylpropane and like chlorinated hydrocarbons. Exemplary ketones are 2-pentanone, 3-pentanone, 2-hexanone, 2,4-pentanedione and the like. Suitable ethers include diethyl ether, dipropyl ether, dimethoxy ether, furan, tetrahydrofuran and the like. Mixtures of mutually miscible organic solvents also can be used. The preferred organic solvent is methylene chloride.

Suitable U.V. stabilizers includes the following commercial materials:

Cyasorb U.V. 9: 2-hydroxy-4-methoxybenzophenone (Trademark of American Cyanamid)

Cyasorb U.V. 531: 2-hydroxy-4-n-otctoxybenzophenone (Trademark of American Cyanamid)

Cyasorb U.V. 5411: 2(2'-hydroxy-5'-t-octylphenyl)-bendzotriazole (Trademark of American Cyanamid)

Tinuvin P: 2(2'-hydroxy-5'-methylphenyl)benzotriazole (Trademark of Ciba-Geigy)

Tinuvin 326: 2-(3't-butyl-2'-hydroxy-5'-methylphenyl)-5-chlorobenzotriazole (Trademark of Ciba Geigy)

Sanduvor VSU: 2-ethyl-2-ethoxyanilide (Trademark of Sandoz Corp.)

Tinuvin 144 and 770: hindered amine light stabilizers (Trademark of Ciba-Geigy for HALS)

Irgastab 2002: a nickel phosphate (Trademark of Ciba-Geigy)

Tinuvin 1130: benzotriazale light stabilizer (Trademark of Ciba-Geigy)

The following is a partial list of these and other benzophenone and triazoles which are suitable U.V. stabilizers for use herein, although salicylates, formamidines, oxanilides, HALS, benzoates, etc. may be used as well.

2,2'-dihydroxybenzophenone
2,2,4,4'-tetrahydroxypenzophenone
2,2'-dihydroxy-4,4'-dimethoxybenzophenone
2,2'-dihydroxy-4,4'-diethoxybenzophenone
2,2'-dihydroxy-4,4'-dipropoxybenzophenone
2,2'-dihydroxy-4,4'-dibutoxybenzophenone
2,2'-dihydroxy-4-methoxy-4'-ethoxybenzophenone
2,2'-dihydroxy-4-methoxy-4'-propoxybenzophenone
2-hydroxy-4,4',5'-trimethoxybenzophenone
2-hydroxy-4-ethoxy-4'-methylbenzophenene
2-hydroxy-4-ethoxy-4'-ethylbenzophenone
2-hydroxy-4-ethoxy-4'-propylbenzophenone
2-hydroxy-4-ethoxy-4'-methoxybenzophenone
2-hydroxy-4,4'-diethoxybenzophenone
2-hydroxy-4-ethoxy-4'-propoxybenzophenone
2-hydroxy-4-ethoxy-4'-butoxybenzophenone
2-hydroxy-4-ethoxy-4'-chlorobenzophenone
2-hydroxy-4-ethoxy-4;-bromobenzophenone
2-(2'-hydroxy-5'-methylphenyl)benzotriazole
2-(2'-hydroxy-5'-t-butylphenyl)benzotriazole
2-(2'-hydroxy-3'methyl-5-t'-butylphenyl)benzotriazole
2-(2'-hydroxy-5'-cyclohexylphenyl)benzotriazole
2-(2'-hydroxy-3',5'-dimethylphenyl)benzotriazole
2-(2'-hydroxy-5'-t-butylphenyl)-5-chlorobenzotriazole
and
2-(2'-hydroxy-3'-di-t-butylphenyl)benzotriazole
2,2'-dihydroxy-4-methoxy-4'-butoxybenzophenone
2,2'dihydroxy-4-ethoxy-4'-propoxybenzophenone
2,3'-dihydroxy-4,4'-diemthoxybenzophenone
2,3'-dihydroxy-4-methoxy-4'-butoxybenzophenone
2,3'-dihydroxy-4,4,5'-trimethoxybenzophenone
2-hydroxy-4,4,5'-trimethoxybenzophenone
2-hydroxy-4,4,6'-tributoxybenzophenone
2-hydroxy-4-ethoxy-2,4'-dibutylbenzophenone
2-hydroxy-4-propoxy-4,6'-dichlorobenzophenone
2-hydroxy-4-propoxy-4',6'-dibromobenzophenone
2,4-dihydroxybenzophenone
2-hydroxy-4-methoxybenzophenone
2-hydroxy-4-ethoxybenzophenone
2-hydroxy-4-propoxybenzophenone
2-hydroxy-4-butoxybenzophenone
2-hydroxy-4-methoxy-4'methylbenzophenone
2-hydroxy-4-methoxy-4'-proplybenzophenone
2-hydroxy-4-methoxy-4'-butylbenzophenone
2-hydroxy-4-methoxy-4'-t-butylbenzophenone
2-hydroxy-4-methoxy-4'-chlorobenzophenone
2-hydroxy-4-methoxy-2'-chlorobenzophenone
2-hydroxy-4-methoxy-4'-bromobenzophenone
2-hydroxy-4,4'-dimethoxybenzophenone
2-hydroxy-4,4'-dimethoxy-3-methylbenzophenone
2-hydroxy-4,4'-2'-ethylbenzophenone
2-hydroxy-acetophenone In another embodiment of the invention, the surfactant additive may be included in the water layer. Suitable surfactants for addition to the water layer include water soluble, organic solvent insoluble materials which are present in an effective amount without causing emulsification. Preferably, ionic surfactants, present in a concentration of about 0.001% by wt. to about 0.2% by wt. of the water layer, are used. Amphoteric, ionic and non-ionic surfactants may be used in this invention. A list of suitable surfactants is given in Kirk-Othmer "Encylopedia of Chemical Technology," Vol. 22, p. 332–432.

The invention will be describe with more particularly in the following examples:

Method A

The surfactant was added to (1) a solution of 41 g of Cyasorb U.V. 531 in 99 g of methylene chloride, and/or (2) 450 g of water, which was present as an upper layer over the organic solution. The mixture then was stirred vigorously for two hours, without, however, forming a vortex. Solid material which floated on the surface of the water layer then was collected and weighed. The results are given in Table I on the following page.

TABLE I

| TYPE | SURFACTANT TRADENAME | COMPANY | AMT. OF SURFACTANT ADDED TO MODIFIER LAYER (WT. %) | AMT. OF SURFACTANT ADDED TO WATER (WT. %) | AMOUNT OF PRECIPITATE FORMED (G) |
|---|---|---|---|---|---|
| None | — | | Control | | 1.5 |
| Cationic | Arquad 16-29 | AKZO | | .0067 | none |
| | OPC + | — | | .0022 | none |
| | Ethoquad 18/25 | AKZO | | .022 | 0.3 |
| | DDPC* | — | | .0044–.044 | 0.4 |
| | Ethoquad C12 | AKZO | | .011 | none |
| | Ethoquad 18/25 | AKZO | | .011 | none |
| | Zonyl FSC | Dupont | | .011 | none |
| Anionic | SDS+ | — | | | |
| | Dowfax XDS 8390 | Dow | | .015 | 0.3 |
| | Dowfax XDS 8292 | Dow | | .011 | none |
| Nonionic | Igepal CO210 | GAF | 4.3 | | none |
| | Unithox 480 | | 4.3 | none | |
| | Unithox 720 | | .14 | | .3 |
| | Brij 35 | ICI | | .067 | none |
| | Brij 52 | ICI | .71 | | none |
| | Brij 72 | ICI | .71 | | none |
| | Flourad FC171 | | .35 | | none |
| | Flourad FC430 | | .35 | | 1.5 |
| | Span | ICI | .71 | | trace |

+ catylpyridinium chloride
*dodecylpyridinium chloride
+sodium dodecyl sulfate

Method B

An extended PVC sheet was surface modified using the two phase treatment process described above. A 30 wt.% solution of UV 531 in methylene chloride containing added surfactant was used to apply the modifier composition to the surface of the sheet. The precipitate was collected from the surface of the water after one hour. The results are given in Table II below.

TABLE II

| Surfactant | Amount in Modifier (wt. %) | Amount Ppt. Formed (g) |
|---|---|---|
| None | Control | 2.0 |
| Brij 52 | 3.0 | trace |
| 1:1 Igepal CO520 + CO530 | 3 | .1 |
| Igepal CA420 | 3.7 | 1.5 |
| Tinuvin 1130* | 6.0 | 0.1 g |

What is claimed is:

1. A modifier composition for incorporating a modifier ingredient into the surface region of a resinous article, consisting essentially of:
   (a) about 1-60% by weight of a U.V. stabilizer dissolved in,
   (b) a resin-swellable organic solvent, and
   (c) about 0.1-6% by weight of a surfactant additive.

2. A modifier composition according to claim 1 consisting essentially of:
   (a) about 10-40% by wt. of a U.V. stabilizer dissolved in
   (b) a resin swellable, water-immiscible organic solvent, and
   (c) about 1-3% by wt. of a surfactant additive dissolved therein.

3. A modifier composition according to claim 2 wherein said surfactant additive is a non-ionic surfactant.

4. A modifier composition according to claim 3 wherein said surfactant additive has an HLB of about 3-10.

5. A modifier composition according to claim 1, wherein said organic solvent is methylene chloride.

6. A modifier composition according to claim 1 wherein said organic solvent is selected from the group consisting of halogenated hydrocarbons, ketones, esters and ethers.

7. A modifier composition according to claim 1 wherein said organic solvent is selected from the group consisting of halogenated hydrocarbons having up to two carbon atoms in the chain, aliphatic and cycloaliphatic ketones, aliphatic esters and aliphatic and cycloaliphatic ethers.

8. A modifier composition according to claim 3 wherein said surfactant additive is an ethoxylated alkyl phenol.

9. A modifier composition according to claim 3 wherein said surfactant additive is an ethoxylated alkanol.

10. A modifier composition according to claim 1, wherein said U.V. stabilizer is present in an amount of about 10-40% by weight.

11. A modifier composition according to claim 10, wherein said surfactant additive is present in an amount of about 1-3% by weight.

12. A modifier composition according to claim 11, wherein said surfactant additive is a non-ionic surfactant with an HLB of about 3-10.

13. A modifier composition according to claim 12, wherein said organic solvent is methylene chloride.

14. A process of incorporating a modifier ingredient into the surface region of a resinous article, comprising:
   immersing said article in a solvent-immiscible liquid composition, which is non-aggressive toward said article, and
   contacting the immersed article with a modifier composition comprising a modifier ingredient in a solvent,
   wherein,
   wherein a surfactant is present in at least either said liquid composition or said modifier composition, or both, in a concentration sufficient to affect the wetting characteristics of said liquid composition or said modifier composition, without causing emulsification thereof, whereby formation of a film of modifier ingredient on the surface of said liquid composition is substantially eliminated.

15. A process according to claim 14 wherein said liquid is water present as an upper layer, and said modifier composition is present as a lower layer, wherein said modifier composition is pumped from said lower layer into said upper layer and directed onto the surface of said article which is immersed in said upper layer whereby said modifier ingredient is incorporated into the contacted surface.

16. A process according to claim 14 wherein said surfactant is present in said liquid composition in a concentration of about 0.001–0.2 weight %.

17. A process according to claim 14 wherein said surfactant is present in said modifier composition in a concentration of about 0.1 to 6 weight %.

18. A process according to claim 17 wherein said surfactant is a non-ionic surfactant.

* * * * *